C. H. OCUMPAUGH.
KEY RESETTING MECHANISM FOR VOTING MACHINES.
APPLICATION FILED OCT. 10, 1904.

991,881.

Patented May 9, 1911.
7 SHEETS—SHEET 1.

C. H. OCUMPAUGH.
KEY RESETTING MECHANISM FOR VOTING MACHINES.
APPLICATION FILED OCT. 10, 1904.

991,881.

Patented May 9, 1911.

Witnesses

Inventor
C. H. Ocumpaugh
By Benj R. Catlin
Attorney

C. H. OCUMPAUGH.
KEY RESETTING MECHANISM FOR VOTING MACHINES.
APPLICATION FILED OCT. 10, 1904.

991,881.

Patented May 9, 1911.

Witnesses

Inventor
C. H. Ocumpaugh
By Benj. R. Catlin
Attorney

C. H. OCUMPAUGH.
KEY RESETTING MECHANISM FOR VOTING MACHINES.
APPLICATION FILED OCT. 10, 1904.

991,881.

Patented May 9, 1911.
7 SHEETS—SHEET 5.

Fig. 8.

Witnesses

Inventor
C. H. Ocumpaugh
By Benj. R. Catlin
Attorney

C. H. OCUMPAUGH.
KEY RESETTING MECHANISM FOR VOTING MACHINES.
APPLICATION FILED OCT. 10, 1904.

991,881.

Patented May 9, 1911.

C. H. OCUMPAUGH.
KEY RESETTING MECHANISM FOR VOTING MACHINES.
APPLICATION FILED OCT. 10, 1904.

991,881.

Patented May 9, 1911.
7 SHEETS—SHEET 7.

UNITED STATES PATENT OFFICE.

CHARLES HERBERT OCUMPAUGH, OF ROCHESTER, NEW YORK.

KEY-RESETTING MECHANISM FOR VOTING-MACHINES.

991,881.

Specification of Letters Patent.

Patented May 9, 1911.

Application filed October 10, 1904. Serial No. 227,766.

*To all whom it may concern:*

Be it known that I, CHARLES H. OCUMPAUGH, a resident of Rochester, in the county of Monroe and State of New York, have invented certain new and useful Improvements in Key-Resetting Mechanism for Voting-Machines; and I do hereby declare the following to be a full, clear, and exact description of the invention, such as will enable others skilled in the art to which it pertains to make and use the same.

This invention relates to voting machines and to indicator or key-resetting mechanism actuated by the voter as he leaves the front or face of the machine after having manipulated keys to indicate his vote or votes preparatory to counting by appropriate registers, the movement of the keys in this particular machine having no direct action to effect such counting.

The object of the invention is to effect the resetting of keys or indicators without locking them so that they can be at all times freely moved into and out of voted position without actuating the registers and so that they will be reset if moved to voted position by every full movement of the turnstile or equivalent, as shown in the drawings.

The invention consists in the construction herein described and pointed out.

In the accompanying drawing which forms a part of this specification.

Numeral 1 denotes the axis of a turnstile, rotary curtain frame or equivalent and 2 a gear fixed on said axis to drive a gear 3 fixed on a shaft 4 which by means of gears 5 and 6 rotates shaft 7 and cam disk $7^x$ fast on said shaft 7. Normally the curtain is back and the face plate of the machine exposed, and the turnstile is in corresponding situation.

8 denotes a resetting bar shown in the present instance as passing through a slot 9 in an interlocking strap 10 forming one of a series adapted for group voting as customary. Each strap is provided with an indicator or key 11 whereby it is moved to produce an interlock by means of wedges or thick parts 12 drawn between angle bars 13 and abutments 21. This particular form of interlocking device however is not essential to the present improvement.

Figure 1:
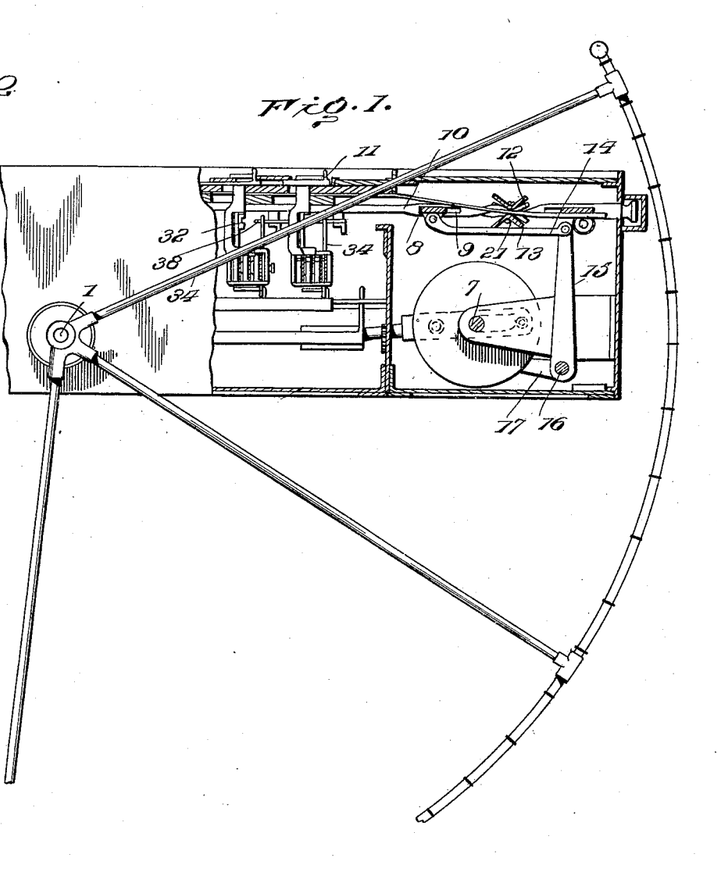
Figure 1 is a broken plan of a voting machine showing a turnstile or rotatable curtain support.
Figure 2:
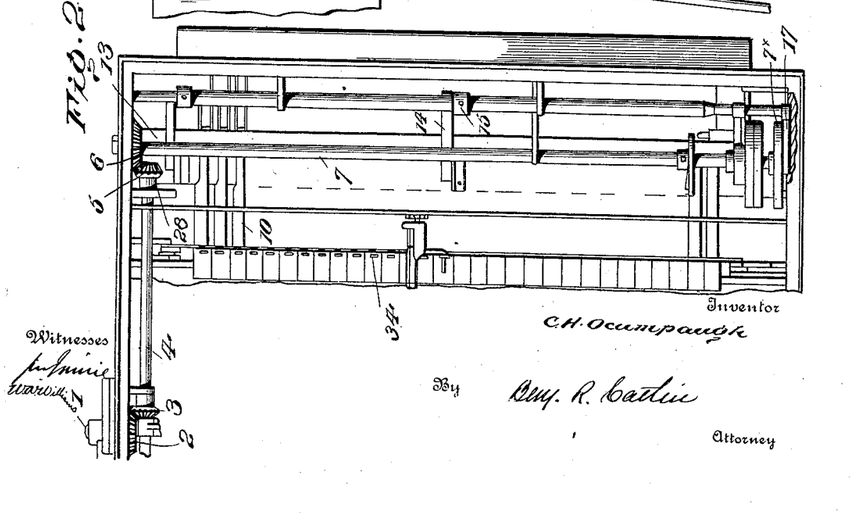
Fig. 2 is a partial vertical section in a plane near the axis of the turnstile and showing intermediate mechanism for actuating the resetting bar.
Figure 3:
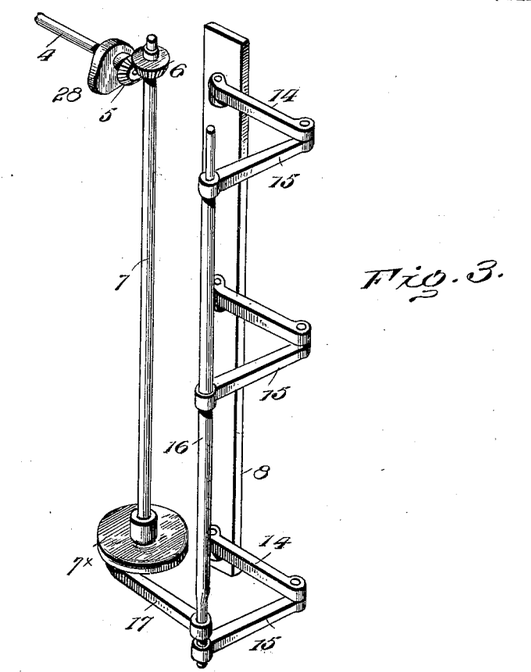
Fig. 3 is a perspective of the resetting bar and a part of its actuating mechanism.
Figure 4:
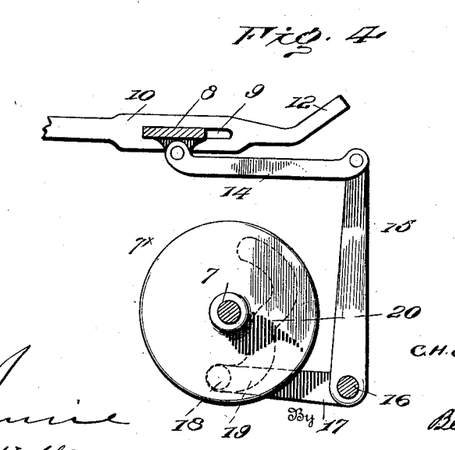
Fig. 4 is a transverse section of the same, a part of an indicator-interlocking-strap being included to show the situation occupied by the bar at all times except when moving.
Figures 5, 6:
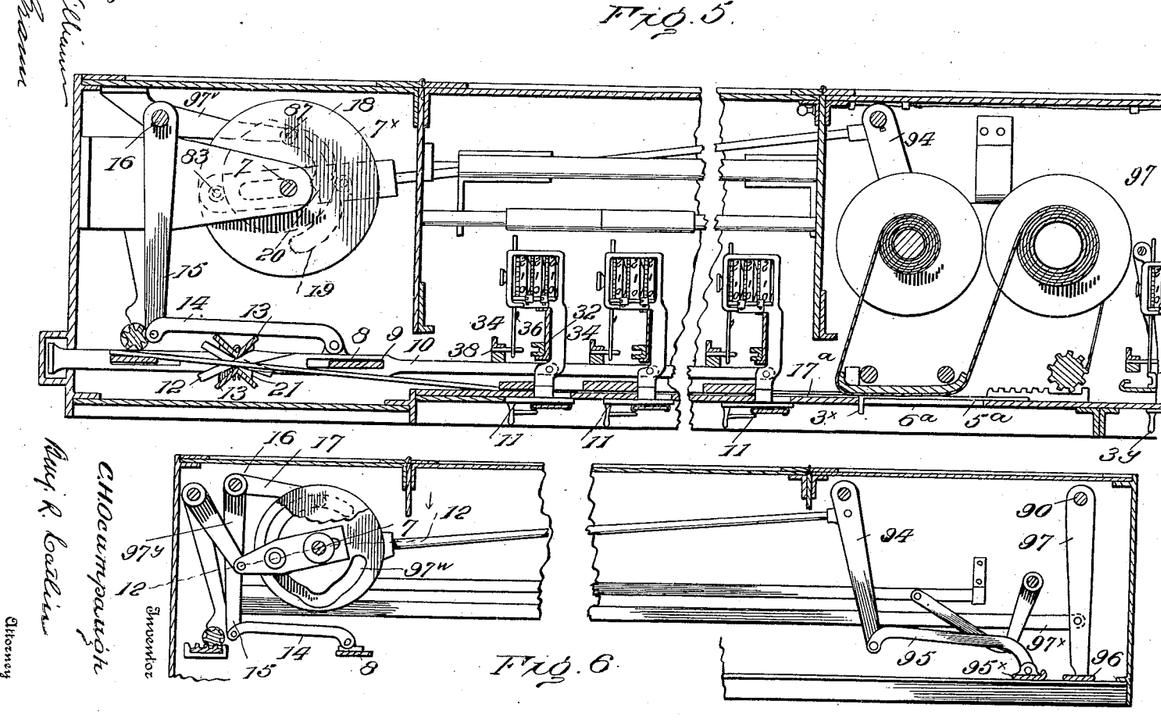
Fig. 5 is a partial horizontal section taken just above the line of the voting keys.
Fig. 6 is a similar view taken on a lower plane to show the irregular and question vote resetting bars and connected mechanism.
Figure 7:
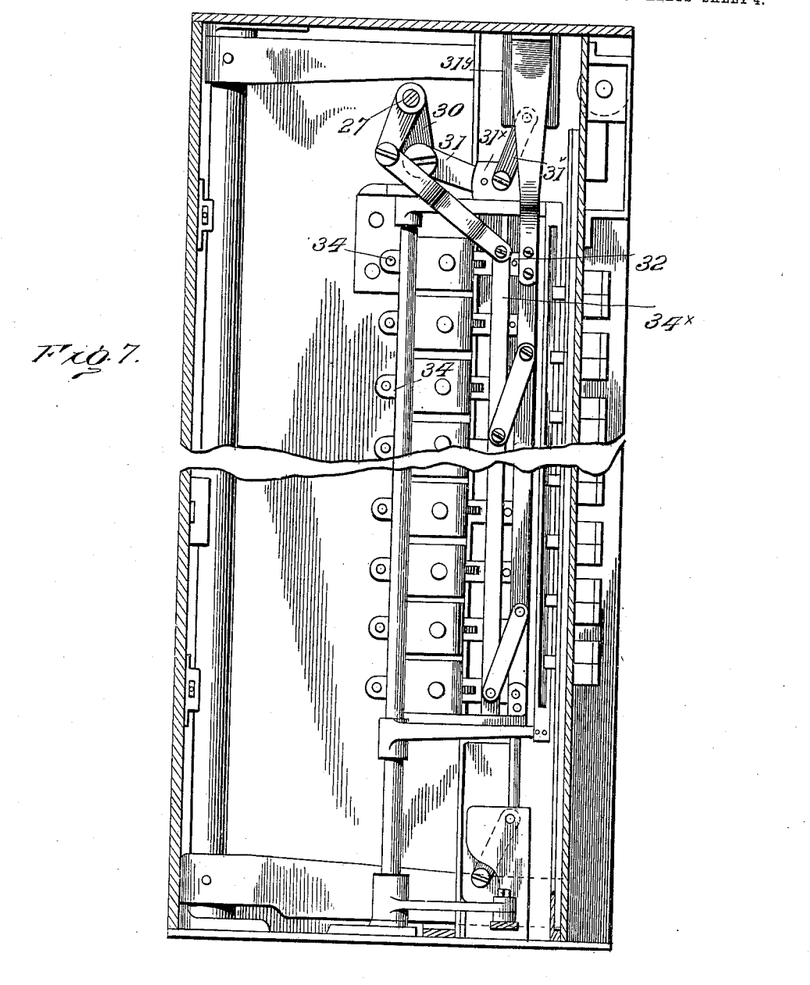
Fig. 7 is a vertical section on line 7, 7 of Fig. 8.
Figure 8:
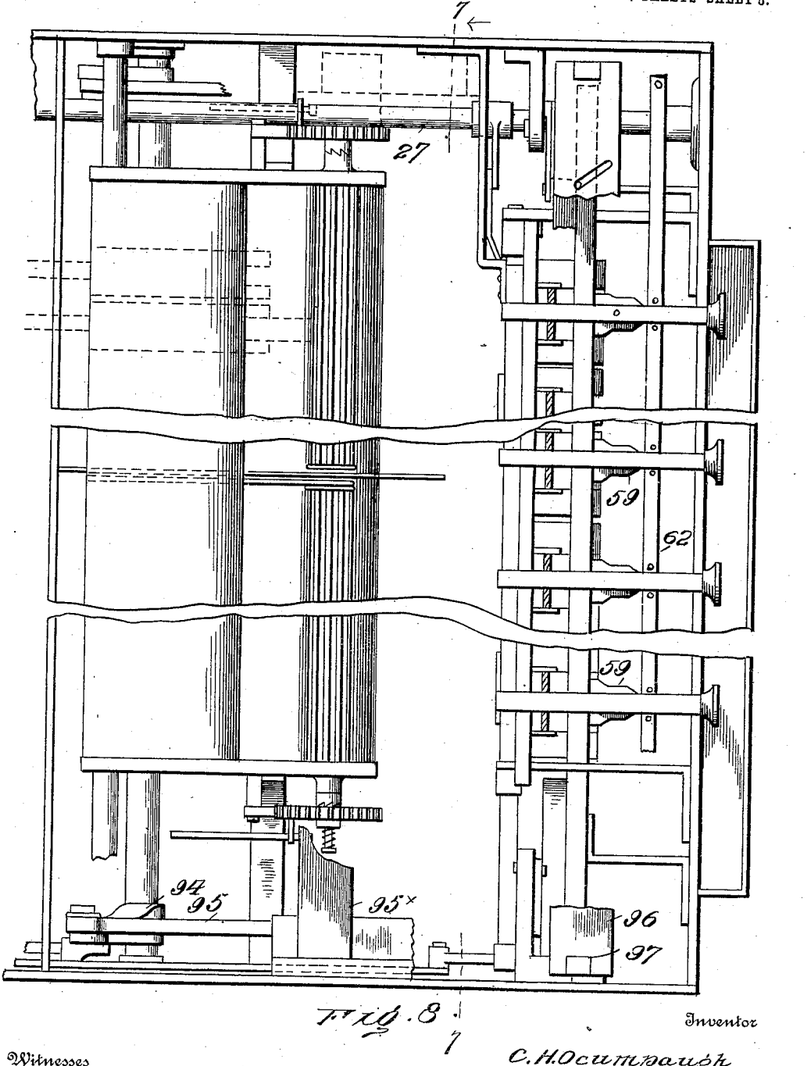
Fig. 8 is a front elevation of the independent vote mechanism and of the question mechanism.
Figure 9:
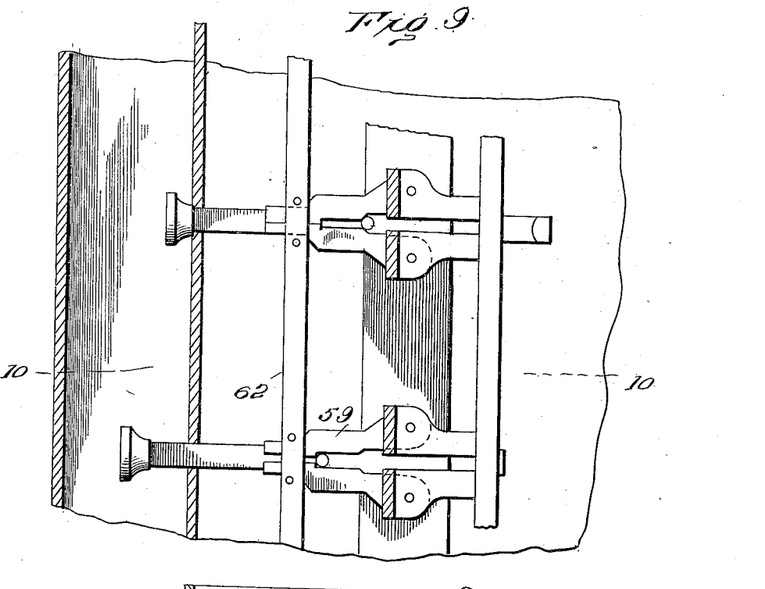
Fig. 9 is a partial vertical section looking to the front of the lock-out device of the question mechanism.
Figure 10:
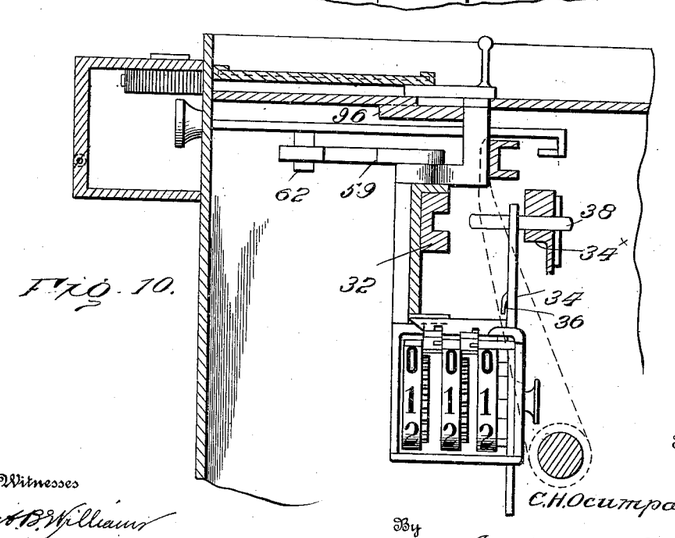
Fig. 10 is a horizontal section on line 10, 10 of Fig. 9.
Figure 11:
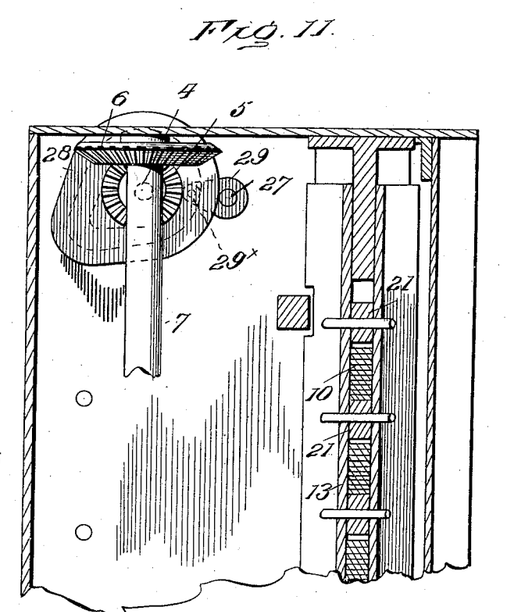
Fig. 11 is a partial section showing mechanism intermediate the turn-stile and resetting mechanism.
Figure 12:
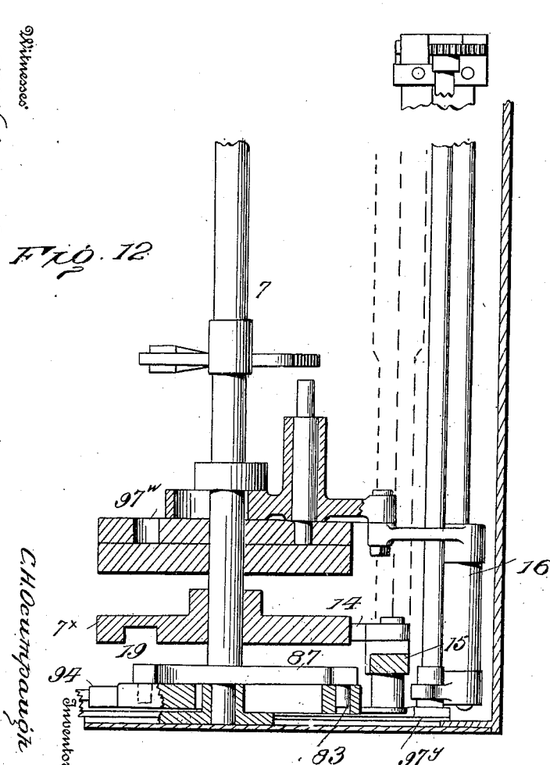
Fig. 12 is an enlarged vertical section on line 12, 12 of Fig. 6.

The resetting bar is shown in its normal situation in Figs. 1 and 4 and each interlocking strap is indicated in a situation relative to said bar corresponding to the unlocked situation of the strap. If the key or indicator corresponding to said strap be moved to indicate a vote the key-connected strap 10 is moved lengthwise, the bar being thereby situated in the end of slot 9 next to the wedge end 12 of the strap.

The before described cam is made operative to move the bar to reset all straps and keys that have been left in voted position and to return said bar after such resetting by means of links 14, one of which is pivotally connected both to the bar and to one of several arms 15 fixed to a shaft 16 to which is also fixed an arm 17 having a pawl pin or roller 18 traveling in a groove 19 whenever shaft 7 is moved by the turnstile or the like, the arms 17 and 15 thus constituting an angle lever. Said groove has two parts each concentric with the shaft and continuous with an intermediate part 20 which latter part of the pawl-pin-course causes rocking of shaft 16 and the reciprocation of bar 8 to effect the resetting of voted keys and return the bars to an inoperative situation, all keys or indicators being thereby left unlocked.

28 denotes a cam disk having a cam-pin-course to control devices not shown whereby when the voter leaves the face of the machine after indicating his preferred candidates and moves the curtain frame or the like his votes are registered. The said cam by reason of a suitable concentric part of the cam-course is inoperative during the return of the curtain frame when the next voter moves it to inclose himself in front of the machine. This particular mechanism is more fully set forth in my application 184,187 filed Dec. 7, 1903, and is not claimed herein. At all times except when the resetting bar is being reciprocated the keys can be freely manipulated for inspection or other purposes by officials or others and without actuation of the registers. This permits voters during an election to be instructed by actual demonstration how to select and move the keys to indicate their choice.

In the particular machine illustrated the resetting bar above described resets interlocking devices for the regular indicators. It has no effect upon the registers but is operated in connection with a question-vote key-resetting device that is operable without locking the indicators and with irregular-voting-key-resetting-devices that so lock their indicators.

The before mentioned shaft 4 oscillates a parallel shaft 27 by means of a cam 28 and a crank arm 29.

$29^x$ denotes a crank pin traveling in the groove of the cam shaped substantially as indicated whereby a complete rotation of shaft 4 oscillates the shaft 27. The latter shaft has arms 30 connected loosely by links 31 with a casting $31^x$ to which is fixed the register-actuating grooved bar 32. Said casting also carries a bar $34^x$ which normally stops, and on suitable occasion, returns a two-stepped pawl bar or slide 34. Said casting is suspended by links $31^y$ from a post $31^y$ fixed to the casing.

36 indicates pawls carried by the slide 34.

38 denotes a pin fixed to said slide being movable with the register frame and key with the effect to enter the pin in a grooved register-actuating bar 32, this pin being entered in a groove when the register is moved by the key to indicate the voter's choice. The same key movement interlocks by drawing the wedge 12 of the strap 10 between abutments 21 to lock out other straps and to mediately lock out other keys and registers. This pin extends to the left of the pawl-slide a sufficient distance to be always in the path of the pawl-slide-holding and returning bar $34^x$. This grooved bar 32 is reciprocated to actuate the two-step-pawl-slide to operate the register by the out going voter.

To enable a voter to vote for any desired person whether or not the person is nominated, his name not appearing on the face of the machine, the series of openings $6^a$ for movable indicators comprising cover-plates or covers $5^a$ having handles or keys $3^x$ is provided. Each of these covers is connected to an interlocking strap $17^a$ having a thick portion or wedge 12 extending to the left beyond the point of interlocking between bars 13 a sufficient distance to permit the cover to be moved to the right to the full extent of the key opening $6^a$ in the face plate and still leave the thickened part of the strap $17^a$ in locked position. This particular strap unlike the others, has no bend at its interlocking end, being made straight to avoid contact with the resetting bar 8.

Either a regular or irregular indicator can be moved but not both at the same time because of interlocking. The indicator or cover when moved to the right uncovers paper drawn across a platen by means of mechanism set forth in my application No. 184,187.

The irregular indicators or cover-plates $5^a$ are reset as the voter leaves the machine by means of the shaft 7 and intermediate devices. Fixed to said shaft is a cam 87 rotating between the pins 83 and it thereby actuates a lever 94 connected by a link 95 with the resetting bar $95^x$ for the irregular vote.

At the right hand of the machine is the question column comprising thirty indicators arranged in pairs, one of the indicators representing the word "Yes" or "For" and the other the word "No" or "Against." The question-voting mechanism comprises the indicators and register cases similar to the regular indicators except as to the dimensions of their faces or keys $3^y$. The mechanism is substantially the same and the registers are actuated in the same manner as are the registers belonging to the regular indicators. The interlocking mechanism however is distinct and separate. Each of the register frames and indicators is pivotally attached to an interlocking wedge 59. The wedges belonging to a pair of question indicators are arranged in pairs and the thin edge of the wedges in normal position extends into an opening in a vertical bar 62 the opening or hole being of such size as to permit the insertion of the thickened portion of one wedge but not the insertion of two at the same time. The hole, however, is of sufficient size to contain the thickened portion of one wedge and the thin portion of its fellow. The construction allows one only of the indicators of a pair to be actuated.

The question indicators are reset by bar 96. It is necessary for the question-indicators-resetting bar to be inoperative as a locking bar at all times except in the operation of resetting. Otherwise it would interfere with the official lockout. It is therefore returned immediately to the normal position by the resetting mechanism. This mechanism comprises the crank arm 97 and its supporting shaft 90. The arm 97 is reciprocated by a bar 97$^x$ connecting with a bell crank arm 97$^y$. Said arm 97$^y$ is fixed to an oscillating shaft, and 97$^v$ is an arm fixed to the same, which arm carries a pin traveling in a groove 97$^w$ in a cam 75$^x$ fixed on shaft 77 whereby the question resetting bars are reciprocated.

I do not limit the invention to the particular type of voting machine shown since, if desired, the registers may be operated by the keys as shown in my application Serial Number 636,095, and this operation may be accomplished either directly by the keys or indirectly by other intermediate mechanism.

Though a turnstile is mentioned, a lever, crank, arm, gate, or barrier of any description may be used, and it may have either a reciprocating movement or a continuous rotary movement.

Under the term indicators I wish to be understood as including any device for indicating a choice of candidates whether registration of selected candidates takes place simultaneously with the indication or selection, or at a later period of time.

I do not limit the invention to the particular style of construction of machine shown in the drawings and the invention is intended to cover all voting machines which require a resetting mechanism.

Having described the invention what I claim is:—

1. In a voting machine, the combination of a voting key or indicator freely movable into and out of voted position, and resetting means movable first into and then out of operative relation to said indicator during an operative movement of said means.

2. In a voting machine, voting keys or indicators, a key-resetting member said keys being normally free from said member, and mechanism to actuate the member and return it to its original situation apart from the keys in one operation.

3. In a voting machine, a turnstile or the like, keys or indicators, a key-resetting device normally disengaged from the indicators, and mechanism intermediate the turnstile and said device to actuate said intermediate device and leave it in normal situation.

4. In a voting machine, a turn-stile, voting keys, a key resetting device, operating connections for said device between said keys and turn-stile operative to reset all keys left in voted position whether by ingoing or outgoing movement of said turn-stile, registers, register actuators, and operating connections for the register actuators between such actuators and turn-stile said actuators being operable to actuate voted registers and effect a count by an outgoing movement only, and means whereby said actuators are reset by an ingoing movement of the turnstile.

5. In a voting machine, a turn-stile, voting keys, a key resetting device, operating connections adapted to reciprocate said resetting device resetting any key left in voted position, said connection being operative on the resetting device whether the movement of the turn-stile be ingoing or outgoing, and such outgoing movement leaving the keys free to move.

6. In a voting machine, a turn-stile, voting keys, a key resetting device, connections adapted to reciprocate said resetting device to reset any key left in voted position such connection being operative on the resetting device whether the movement of the turn-stile be ingoing or outgoing, registers, register actuators normally in inoperative relation with the registers, said registers being movable by the corresponding keys into operative relation to the actuators.

7. In a voting machine, voting keys normally free to move, registers, register-actuating means, a key resetting device, a turn-stile, connections between the turn-stile and register actuating means, and connections between the turn-stile and key-resetting device, said turn-stile when moved through its course in opening direction actuating voted registers, resetting voted keys to normal position.

8. In a voting machine, a turn-stile, keys, a register for each key, register-actuating means comprising an actuating part normally out of operative relation with the register, an operating connection between said actuating part and the turn-stile and adapted to reciprocate said actuating part when the turn-stile is moved in one direction or the other, means operated by each key for placing its register and actuating device into operative relation, whereby either movement of the turn-stile moves said actuating part but operates a register only when its key is in voted position.

9. In a voting machine, a turn-stile, keys, a register for each key, register-actuating means comprising an actuating part normally out of operative relation to the register, operating connections between said actuating part and the turn-stile and adapted to reciprocate said actuating part when the turn-stile is moved in one direction or the other, means operated by each key for placing its register and actuating device into operative relation, whereby either movement of the turn-stile moves the actuating part but operates a register only when its key is in voted position, a key resetting device, and means for moving the key-resetting device operated by either movement of the turnstile, whereby voted keys if any are reset whichever direction the turn-stile is moved.

10. In a voting machine, a turn-stile, keys, a register for each key, register-actuating means comprising an actuating part normally out of operative relation to the register, an operating connection between said actuating part and the turn-stile and adapted to reciprocate said actuating part when the turn-stile is moved in one direction or the other, means actuated by each key for placing its register and actuating device into operative relation, whereby either movement of the turn-stile moves the actuating part but operates a register only when its key is in voted position, a key-resetting device, and means for operating the key-resetting device operated by either movement of the turn-stile whereby voted keys if any are reset whichever direction the turn-stile is moved, the keys each being movable to voted position and back to unvoted position whether the turn-stile is open or closed without operation of its register.

11. In a voting machine, a turn-stile, a series of keys, registers, means for indicating a selected vote, and means for resetting the key by a movement of the turn-stile the registers remaining unactuated.

12. In a voting machine, the combination of a turn-stile, registers, register-resetting mechanism, operating connections between the turn-stile and registers and resetting mechanism, and keys freely movable into and out of voted position independently of said resetting mechanism at both ends of its movement.

13. In a voting machine, the combination of a reciprocating turn-stile or the like, keys freely movable into and out of voted position, and key-resetting means movable into and then out of operative relation to said keys during an operative movement of said means.

14. In a voting machine, a turn-stile, a series of keys for regular party candidates, a series of keys representing irregular or unnominated candidates, and a resetting means for each class of keys, the irregular resetting means locking the irregular keys against movement when the turn-stile is at the end of its opening movement and the regular resetting means at the same time leaving the keys of the regular candidates free to be operated.

15. In a voting machine, a turn-stile, a series of keys for regular party candidates, a series of keys for questions, and resetting means for each class of keys, said resetting means permitting both classes of keys to be actuated when the turn-stile is at the end of its opening movement.

16. In a voting machine, a turn-stile, a series of keys for regular party candidates, a series of keys for questions, resetting means for each class of keys, said resetting means permitting both classes of keys to be actuated when the turn-stile is at the end of its opening movement, a series of keys for irregular candidates, and means for locking the irregular keys against movement when the turn-stile is at the end of its movement.

17. In a voting machine, a reciprocating turn-stile, resetting mechanism, and registering mechanism, the registering mechanism being operable once only and the resetting mechanism twice during the reciprocation constituting a complete cycle of operation of the turn-stile.

18. In a voting machine, a turn-stile, resetting mechanism, registering mechanism, and means consisting of two separate cams each having a different path, whereby during a complete cycle of operation of the turn-stile the registering mechanism is operated but once, and the resetting mechanism is operated twice.

19. In a voting machine, a turn-stile, voting keys, key-resetting means, an operating connection between the turn-stile and said resetting means, and a connection between said resetting means and the keys inoperative when the turn-stile is open thereby leaving the keys free to be actuated when the turn-stile is open.

20. In a voting machine, a reciprocating turn-stile, keys, resetting mechanism, and means connecting said turn-stile and resetting mechanism, whereby during a complete cycle of operation of the turn-stile the resetting means is reciprocated twice.

21. In a voting machine, a reciprocating turn-stile, interlocking mechanism, and a device resetting said mechanism to normal position twice during a complete cycle of operation of the turn-stile.

22. In a voting machine, a reciprocating turn-stile, resetting mechanism, interlocking mechanism, and connections between said turn-stile and resetting mechanism, the interlocking mechanism being free to be moved when the turn-stile is at each end of its movement.

In testimony whereof, I have signed this specification in the presence of two subscribing witnesses.

CHARLES HERBERT OCUMPAUGH.

Witnesses:
A. M. GREENWOOD,
JOHN GEO. O'BRIEN.

---

Copies of this patent may be obtained for five cents each, by addressing the "Commissioner of Patents, Washington, D. C."